Patented Sept. 28, 1948

2,450,276

UNITED STATES PATENT OFFICE 2,450,276

PROCESS FOR PRODUCTION OF OXYGEN

Benjamin B. Fogler and Leroy F. Marek, Lexington, Mass., assignors to Arthur D. Little, Inc., Cambridge, Mass., a corporation of Massachusetts No Drawing. Application July 7, 1944, Serial No. 543,970

3 Claims. (Cl. 23—221)

1

The invention relates to the production of oxygen and more particularly to the production of oxygen by chemical means.

In the production of oxygen by chemical means several methods are available, the most practical commercially being the methods involving oxygen absorbing-desorbing compounds. This invention involves the use of such compounds of the chelate type. One of the difficulties in using these compounds has been that the activity or life of the chelate compounds was insufficient to make the process practical. That is, the high cost regenerating material did not produce enough oxygen per pound of material to make the cost of oxygen low enough to compete with other known processes for producing oxygen such as by the distillation of liquid air. It was recognized, however, that if the deterioration of the chemical could be controlled, the process of producing oxygen by such a method would be inherently more simple and would produce oxygen more cheaply than any of the known processes which involve the complex apparatus and difficult working conditions inherent in dealing with such explosive and dangerous mixtures as liquid air and liquid oxygen and impurities always present. The rate of starting up from a standby condition by the liquid oxygen method is slow and is particularly so if no liquid oxygen is present when operations are begun.

An object of this invention is, therefore, to increase the life of chelate compounds which are capable of absorbing and desorbing oxygen in a process for producing oxygen. Another object is to produce substantially pure oxygen with a short starting time. Other objects will be evident from the following disclosure:

Among the chelate compounds which have been found suitable for use in the production of oxygen by the regenerative cyclic process of the present invention is the cobalt chelate compound of the Schiff base of ethylene diamine and salicylaldehyde. Derivatives and substitution products thereof, having the general formula given below are also suitable. The general formula is:

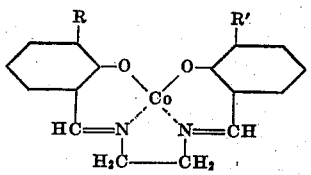

These compounds exhibit a considerable range of properties and hence can be used under a corresponding variety of conditions, as indicated below.

The parent compound in this series is the cobalt chelate compound of the Schiff base of ethylene diamine and salicylaldehyde, which is unsubstituted at R and R' (i. e., wherein R and R' are hydrogen). This compound is also known as "Co-Sal-En" and as "Salcomine." It has a theoretical oxygen capacity of 4.95% of its own weight and absorbs oxygen from air at room temperatures with a heat release of about 1100 B. t. u. per pound of oxygen absorbed. The oxygen-saturated material will desorb oxygen into a vacuum at temperatures as low as 30° C. and the half saturated compound will desorb oxygen against a pressure of one atmosphere at a temperature between 50 and 60° C.

The 3-methoxy and 3-ethoxy derivatives of Salcomine, known respectively as "Methomine" and "Ethomine," also have the property of absorbing and desorbing oxygen as does the parent compound. Their structures correspond to that of the foregoing formula wherein R and R' are respectively methoxy groups, —OCH$_3$, or ethoxy groups, —OC$_2$H$_5$. Ethomine functions in a higher temperature range than Salcomine, i. e. will absorb oxygen from air at a higher temperature than Salcomine and requires a higher temperature for desorption, but deteriorates at a considerably higher rate.

The fluorine derivative, known as "Co-3F-Sal-En" and as "Fluoramine," has a structure corresponding to that of the foregoing formula wherein both R and R' are fluorine. It has an extremely high rate of absorption at temperatures above that needed for Salcomine.

A number of other derivatives of Salcomine having structures corresponding to the foregoing formula are also capable of use as oxygen regenerative materials in the practice of the present invention.

The following is a description of the process used to attain the objects of the present invention.

In obtaining oxygen from chelate compounds which are capable of absorbing and desorbing oxygen such compounds are conveniently placed in a reaction bed provided with heat exchange means. Alternate cooling and heating of the chelate compound is effected by means of the heat exchange means. By introducing cooling fluid (i. e. extracting heat), and by supplying air under pressure to the chelate compound, absorption of oxygen from the air is accomplished. The flow of air is stopped when sufficient oxygen has been absorbed and the chelate compound is then heated causing the oxygen to be desorbed. By introducing heating fluid (i. e. adding heat), and by reducing the pressure (and also removing the spent air) desorption is accomplished. This cycle of absorption and desorption is repeated until the chelate compound no longer has ability to pick up and release sufficient oxygen, whereupon the compound is replaced by a fresh lot and the cycle is repeated as required.

Normally, it would be thought that in order to obtain the maximum quantity of oxygen per pound of chelate compound, maximum absorption and desorption must be carried out. That is, in order to obtain the most oxygen from a pound of chelate compound the most logical way would be to use it to the limit of its capacity. By so doing the maximum effective utilization of the material would be expected.

It is found, however, in accordance with the present invention, that somewhat less than full absorption and desorption of oxygen increases the number of pounds of oxygen that may be produced from a pound of chelate compound during its useful life. When absorption and desorption are carried out within certain ranges below 100% of complete reaction, the number of cycles which can be run economically is greatly increased. In addition to thus increasing the effective life of the compound, it is also found by the process of this invention that increased hourly yields of oxygen are obtained.

The invention therefore establishes that less than complete absorption and desorption is desirable and it further establishes that the desirable extent of absorption is when between 40% and 75% of the capacity of the chelate compound to absorb oxygen has been satisfied, and that the desirable extent of desorption is when the oxygen content of the compound has been reduced to 5% to 30% of saturation capacity. That is, if absorption and desorption are extended beyond these zones, the chelate compound degenerates without a corresponding increase in total yield of oxygen. Stated in another manner; the total amount of oxygen absorbed or desorbed is at a maximum per pound of chelate compound exhausted in the zone described above; when the extent of absorption and desorption are outside of these zones, the efficiency of the compounds falls off rapidly.

This invention still further establishes that although changes in temperatures of heating and cooling liquid, in pressure of operation conditions, in the amount of water vapor in the air, in the rate of air flow, and in the particular chelate compound used, all affect the amount of oxygen produced more or less, the zone of best operation as above defined will yield, under a given set of conditions, the greatest amount of oxygen per pound of chelate compound. It is further established that although favorable performance is obtained by operating within the limits defined, the best results are obtained when between 50% and 65% of the capacity of the chelate compound to absorb oxygen has been satisfied, and when desorption is discontinued when the oxygen content of the compound has been reduced to from 10% to 20% of saturation capacity.

In actual operation the production of oxygen is accomplished by the following cycle: air under pressure is passed through the chelate compound for a long enough time to absorb sufficient oxygen, the chelate having been cooled by means of a heat exhanger; the chamber in which the chelate compound is placed is then vented, and desorption induced by heating the chelate compound. Under the process of this invention desorption takes less time than absorption, and therefore, less time is allotted to desorbing oxygen than to absorbing it.

The deterioration of the chelate compound, as evidenced by progressive loss of activity, capacity, or both, may conceivably be due to either a physical break-down or chemical attack or combination of both. Since the operating cycle is based on the alternate heating and cooling of the granular chelate material, accompanied by expansion and contraction, a portion of the deterioration may be expected to occur from this cause alone whether or not oxygen is being produced. Absorption and desorption of oxygen by the granular material is accompanied by relative expansion and contraction, the exact relation between amount of oxygen absorbed and expansion being unknown. This "working" of the chelate compound may be expected to contribute to its deterioration. Furthermore, exposure of the chelate compound to oxygen, especially at the portion of the cycle during desorption when the temperatures are the highest and the oxygen concentration the greatest, may be expected to result in a certain amount of chemical reaction by oxidation and to thus give rise to deterioration.

The relative degree to which these factors influence the deterioration of the active organic compound cannot be predicted from the results of operation for oxygen production in the normal way. Neither could it be predicted that any particular variation of the cycle or operating conditions would result in either a gain or loss in deterioration rate. Obviously, for practical use operation must be under conditions that result in a reasonably complete stripping of oxygen from the feed air and oxygen production must be at a suitably high hourly rate. The deterioration reaction would probably proceed with greater speed at periods when the compound is hot and exposed to a high partial pressure of oxygen, as during desorption. Since all cemical reactions have some definite rate, for any given amount of exposure to deteriorating conditions a certain amount of degeneration will occur in any case. But it has been found that by operating by the process of this invention the life and productivity of the regenerative chemical is at a maximum.

To illustrate, but not to limit, the scope of the invention, the following examples are given. The first two show the effect of operating in regions which would normally be expected to give good results; the second two are operated according to the process of this invention. "Salcomine" was the regenerative chemical employed in each example. Similar results are obtained with "Salcomine" derivatives.

*Example I*

Absorption during each cycle was continued until from 78% to 85% of the capacity of the chelate compound to absorb oxygen had been satisfied.

Desorption was discontinued in each cycle when the oxygen content of the compound was completely removed. When a sufficient number of cycles had been run to produce 14.1 lbs. of oxygen per pound of Salcomine the capacity of the compound to absorb oxygen had dropped to 59% of its original value.

Example II

Absorption during each cycle was continued until 80% of the capacity of the chelate compound to absorb oxygen had been satisfied.

Desorption was discontinued in each cycle when the oxygen content of the compound was completely removed. When 14.1 lbs. of oxygen had been produced per pound of Salcomine, the capacity of the compound to absorb oxygen had dropped to 57.5% of its original value.

Example III

Absorption during each cycle was continued until 75% of the capacity of the chelate compound to absorb oxygen had been satisfied.

Desorption was discontinued in each cycle when the oxygen content of the compound was 10% of saturation capacity. When 14.1 lbs. of oxygen had been produced per pound of Salcomine, the capacity of the compound to absorb oxygen had dropped only to 85.5% of its original value.

Example IV

Absorption during each cycle was continued until 57.5% of the capacity of the chelate compound to absorb oxygen had been satisfied.

Desorption was discontinued in each cycle when the oxygen content of the compound was 10% of saturation capacity. When 14.1 lbs. of oxygen had been produced per pound of Salcomine, the capacity of the compound to absorb oxygen had dropped only to 90% of its original value.

It is found, as already indicated, that if the degree of absorption is increased beyond about 75% or is less than about 40% of its capacity to absorb, there is a marked decrease in the length of life of the compound. It is further found that the zone between 50% and 65% gives the most satisfactory results.

With respect to desorption any desorption below about 5% or desorption not below 30% severely affects the life of the compound and the zone between 10 and 20% of saturation capacity gives the best results.

As is evident from the foregoing disclosure, the degree of absorption is regulated by the temperature and by the length of time the regenerative chemical is exposed to oxygen, while the degree of desorption is regulated by the temperature, the pressure, and the time of exposure to desorption conditions.

We claim:

1. The process of separating oxygen from air by means of a chelate compound having the formula

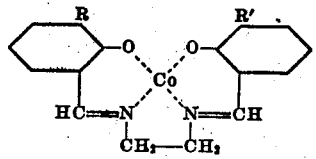

wherein R and R' are the same and are selected from the group consisting of —H, —OCH₃, —OC₂H₅, and —F which comprises providing a mass of said chelate compound, introducing air into said mass, withdrawing heat from said mass to cause it to absorb oxygen from the air, and discontinuing absorption when from 50% to 65% of the capacity of the chelate compound to absorb oxygen has been satisfied, heating said mass to cause it to release oxygen, and discontinuing desorption when the oxygen content of the compound is from 10% to 20% of saturation capacity.

2. The process according to claim 1 wherein R and R' are —H.

3. The process according to claim 1 wherein said chelate compound is a fluorine derivative of the cobalt compound of the Schiff base of ethylene diamine and salicylaldehyde of the formula:

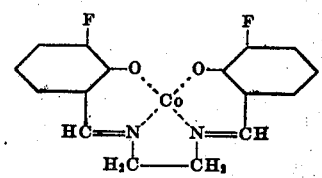

BENJAMIN B. FOGLER.
LEROY F. MAREK.

REFERENCES CITED

The following references are of record in the file of this patent:

UNITED STATES PATENTS

| Number | Name | Date |
|---|---|---|
| 1,091,023 | Sinding-Larsen | Mar. 24, 1914 |
| 2,217,850 | Warne et al. | Oct. 15, 1940 |

FOREIGN PATENTS

| Number | Country | Date |
|---|---|---|
| 365,680 | Germany | Dec. 21, 1922 |

OTHER REFERENCES

Tsumaki, Bull. Chem. Soc. Japan, vol. 13, 1938, pp. 579–581, 252–260, 586, 587, 590 and 591.